(12) United States Patent
Shveidel et al.

(10) Patent No.: US 11,809,835 B2
(45) Date of Patent: Nov. 7, 2023

(54) SYSTEM AND METHOD FOR EFFICIENT QUEUE MANAGEMENT

(71) Applicant: EMC IP Holding Company, LLC, Hopkinton, MA (US)

(72) Inventors: Vladimir Shveidel, Pardes-Hana (IL); Lior Kamran, Rishon LeZion (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 181 days.

(21) Appl. No.: 17/237,519

(22) Filed: Apr. 22, 2021

(65) Prior Publication Data

US 2022/0342633 A1 Oct. 27, 2022

(51) Int. Cl.
*G06F 15/80* (2006.01)
*G06F 5/06* (2006.01)
*G06F 9/48* (2006.01)
*G06F 16/901* (2019.01)
*G06F 9/38* (2018.01)

(52) U.S. Cl.
CPC .............. *G06F 5/06* (2013.01); *G06F 9/3855* (2013.01); *G06F 9/4881* (2013.01); *G06F 16/9024* (2019.01); *G06F 2205/064* (2013.01)

(58) Field of Classification Search
None
See application file for complete search history.

(56) References Cited

U.S. PATENT DOCUMENTS

| 11,526,276 | B2* | 12/2022 | Xu | G06F 3/0659 |
| 2002/0013866 | A1* | 1/2002 | Noeldner | G06F 13/28 710/22 |
| 2002/0108003 | A1* | 8/2002 | Ellis | G06F 13/28 710/39 |
| 2005/0083927 | A1* | 4/2005 | Lien | H04L 47/2441 370/389 |
| 2014/0344536 | A1* | 11/2014 | Benisty | G06F 11/3664 711/159 |
| 2016/0291867 | A1* | 10/2016 | Olcay | G06F 3/068 |
| 2022/0342633 | A1* | 10/2022 | Shveidel | G06F 9/52 |

OTHER PUBLICATIONS

Roche, "Lab 2: Linked Lists", Sep. 7, 2016, www.usna.edu (Year: 2016).*

* cited by examiner

*Primary Examiner* — Hyun Nam
(74) *Attorney, Agent, or Firm* — Brian J. Colandreo; Heath M. Sargeant; Holland & Knight LLP

(57) ABSTRACT

A method, computer program product, and computing system for defining a queue. The queue may be based on a linked list and may be a first-in, first-out (FIFO) queue that may be configured to be use used with multiple producers and a single consumer. The queue may include a plurality of queue elements. A tail element and a head element may be defined from the plurality of elements within the queue. The tail element may point to a last element of the plurality of elements and the head element may point to a first element of a plurality of elements. An element may be dequeued from the tail element, which may include determining if the tail element is in a null state. An element may be enqueued to the head element, which may include adding a new element to the queue.

21 Claims, 6 Drawing Sheets

SYSTEM AND METHOD FOR EFFICIENT QUEUE MANAGEMENT

BACKGROUND

Storing and safeguarding electronic content may be beneficial in modern business and elsewhere. Accordingly, various methodologies may be employed to protect and distribute such electronic content.

As storage systems advance with new storage technologies and protocols, efficiency of queue operations may be of the utmost important to a critical system component such as a run scheduler. For example, a multi-producer/single-consumer first-in, first-out (FIFO) queue may be used by high performance server applications, including a storage cluster. When a FIFO queue is used in connection with multiple producers and a single consumer, any minor contention on spinlock, short busy-wait, or a minor overhead of code of a scheduler itself may cause overall performance degradation. As such, a multi-producer/single-consumer FIFO queue may be computer processing unit (CPU)-inefficient, specifically in regards to enqueuing and dequeuing operations.

SUMMARY OF DISCLOSURE

In one example implementation, a computer-implemented method executed on a computing device may include, but is not limited to, defining a queue, wherein the queue may be based on a linked list and may be a first-in, first-out (FIFO) queue that may be configured to be use used with multiple producers and a single consumer, wherein the queue may include a plurality of queue elements. A tail element and a head element may be defined from the plurality of elements within the queue. The tail element may point to a last element of the plurality of elements. The head element may point to a first element of a plurality of elements. An element from the tail element may be dequeued. Dequeuing an element from the tail element may include determining if the tail element is in a null state. An element may be enqueued to the head element. Enqueuing an element to the head element may include adding a new element to the queue.

One or more of the following example features may be included. Determining if the tail element is in a null state may further include setting, via a consumer, the tail element as null and determining the queue is empty. Determining the queue is empty may include marking the tail element as a last element. The tail element may be updated, via a producer, in response to determining the queue is empty to point to the new element. The tail may be determined to not be in a null state. In response to determining the tail element is not in a null state, the tail element may be set to a null state until a producer updates the tail element. Updating the tail element to point to the new element may include consuming, via a consumer, the last element and marking, via the consumer, the last element for a producer. A last element mark may be defined. The last element mark may be a predefined value that is configured to distinguish a steady last element from a race condition when an element is added to the queue, via a provider, concurrently while an element is dequeued.

In another example implementation, a computer program product resides on a computer readable medium that has a plurality of instructions stored on it. When executed by a processor, the instructions cause the processor to perform operations that may include, but are not limited to, defining a queue, wherein the queue may be based on a linked list and may be a first-in, first-out (FIFO) queue that may be configured to be use used with multiple producers and a single consumer, wherein the queue may include a plurality of queue elements. A tail element and head element may be defined from the plurality of elements within the queue. The tail element may point to a last element of the plurality of elements. The head element may point to a first element of a plurality of elements. An element may be dequeued from the tail element. Dequeuing an element from the tail element may include determining if the tail element is in a null state. An element may be enqueued to the head element. Enqueuing an element to the head element may include adding a new element to the queue.

One or more of the following example features may be included. Determining if the tail element is in a null state may further include setting, via a consumer, the tail element as null and determining the queue is empty. Determining the queue is empty may include marking the tail element as a last element. The tail element may be updated, via a producer, in response to determining the queue is empty to point to the new element. The tail may be determined to not be in a null state. In response to determining the tail element is not in a null state, the tail element may be set to a null state until a producer updates the tail element. Updating the tail element to point to the new element may include consuming, via a consumer, the last element and marking, via the consumer, the last element by the consumer for a producer. A last element mark may be defined. The last element mark may be a predefined value that may be configured to distinguish a steady last element from a race condition when an element is added to the queue, via a provider, concurrently while an element is dequeued.

In another example implementation, a computing system includes a processor and at least one memory architecture coupled with the processor, wherein the processor is configured to define a queue, wherein the queue may be based on a linked list and may be a first-in, first-out (FIFO) queue that may be configured to be use used with multiple producers and a single consumer, wherein the queue may include a plurality of queue elements. The processor may be further configured to define a tail element and a head element from the plurality of elements within the queue. The tail element may point to a last element of the plurality of elements. The head element may point to a first element of a plurality of elements. The processor may be even further configured to dequeue an element from the tail element. Dequeuing an element from the tail element may include determining if the tail element is in a null state. The processor may also enqueue an element to the head element. Enqueuing an element to the head element may include adding a new element to the queue.

One or more of the following example features may be included. Determining if the tail element is in a null state may further include setting, via a consumer, the tail element as null and determining the queue is empty. Determining the queue is empty may include marking the tail element as a last element. The tail element may be updated, via a producer, in response to determining the queue is empty to point to the new element. The tail may be determined to not be in a null state. In response to determining the tail element is not in a null state, the tail element may be set to a null state until a producer updates the tail element. Updating the tail element to point to the new element may include consuming, via a consumer, the last element and marking, via the consumer, the last element for a producer. A last element mark may be defined. The last element mark may be a predefined value that may be configured to distinguish a steady last element from a race condition when an element is added to the queue, via a provider, concurrently while an element is dequeued.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
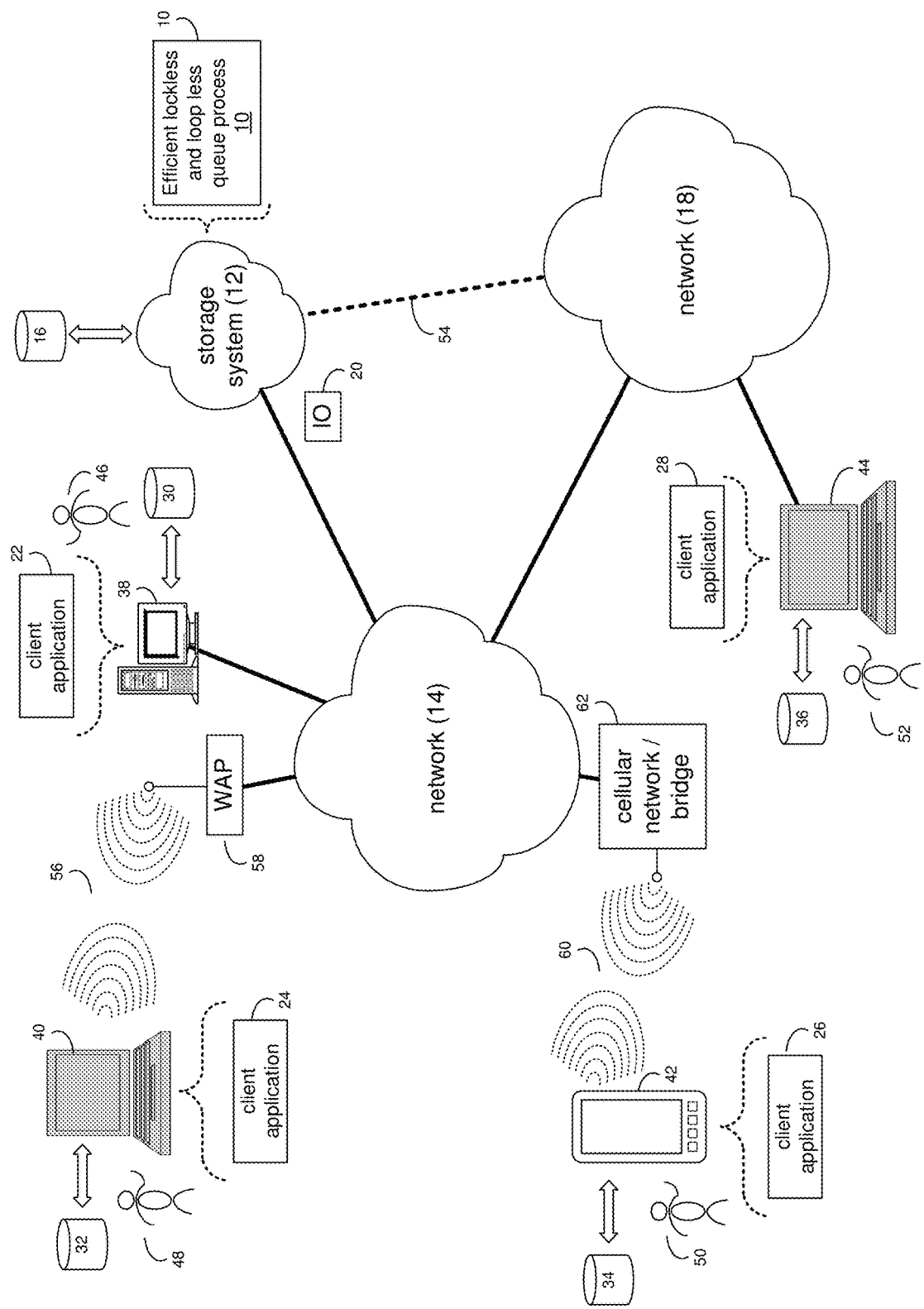
FIG. 1 is an example diagrammatic view of a storage system and an efficient lockless and loop less multi-producer/single-consumer first-in, first-out (FIFO) queue process coupled to a distributed computing network according to one or more example implementations of the disclosure.

Referring to FIG. 1, there is shown efficient lockless and loop less multi-producer/single-consumer first-in, first-out (FIFO) queue process 10 (hereinafter "efficient lockless and loop less queue process 10") that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of efficient lockless and loop less queue process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of efficient lockless and loop less queue process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
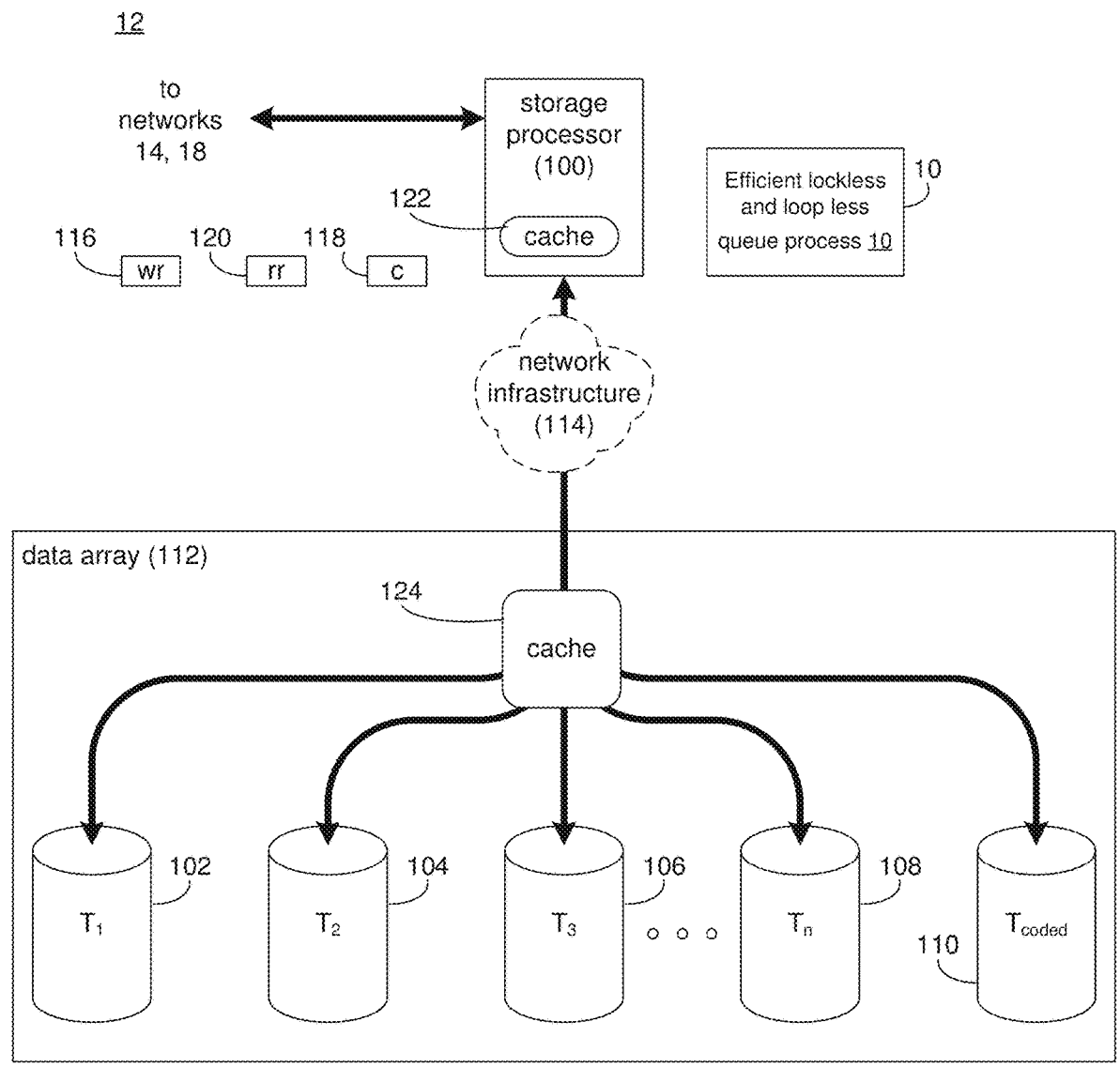
FIGS. 2-3 are example diagrammatic views of the storage system of FIG. 1 according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of lockless and loop less queue process 10. The instruction sets and subroutines of lockless and loop less queue process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of lockless and loop less queue process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of lockless and loop less queue process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of lockless and loop less queue process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Storage Cluster

Figure 3:
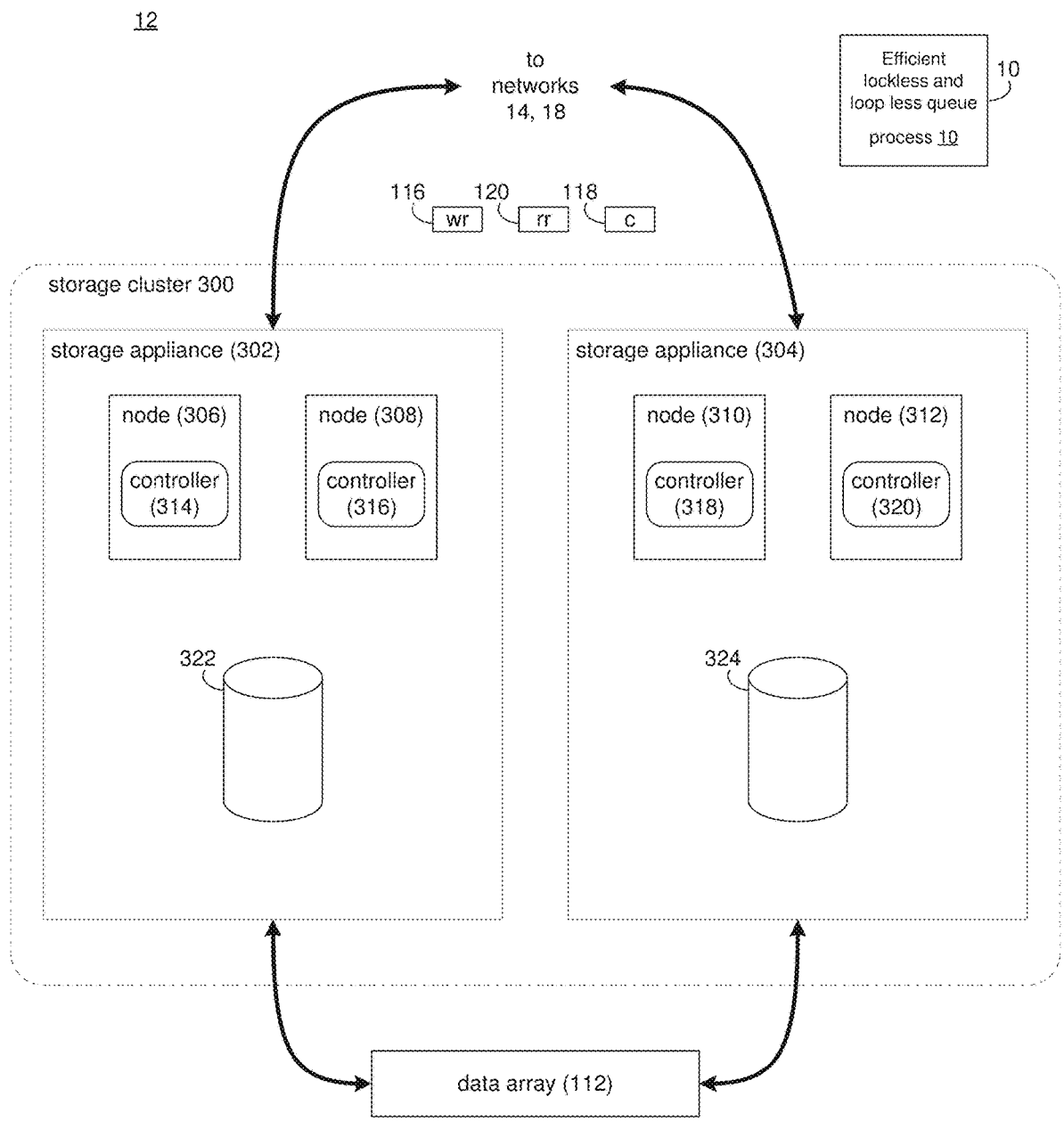

Referring also to FIG. 3, storage system 12 may include a storage cluster (e.g., storage cluster 300) of storage appliances (e.g., storage appliances 302, 304). A cluster of storage appliances (e.g., storage cluster 300) may generally include a Federation composed of multiple appliances, where each storage appliance (e.g., storage appliances 302, 304) may include a plurality of (e.g., at least two) connected nodes/storage processors (e.g., nodes 306, 308, 310, 312) with shared back-end drives (e.g., data array 112) running a storage stack that communicate over a network. In some implementations, each node may include one or more storage controllers (e.g., controllers 314, 316, 318, 320) configured for processing host IO operations on one or more volumes (e.g., volumes 322, 324) managed by a storage appliance.

In some implementations and as will be discussed in greater detail below, each storage appliance may have its own captive storage (e.g., volumes) that are managed by the storage appliance. In some implementations, a volume managed by one storage appliance may not be accessible from any other storage appliance. For example, volume 322 may be managed by storage appliance 302 and volume 324 may be managed by storage appliance 304. In this example, volume 322 may not be accessible by storage appliance 304 and volume 322 may not be accessible by storage appliance 302.

In some implementations, each storage appliance (e.g., storage appliances 302, 304) may be communicatively coupled to a back-end storage array (e.g., data array) via various storage protocols (e.g., Small Computer System Interface (SCSI) (iSCSI), Fibre Channel, Non-Volatile Memory Express (NVMe) over Fabric (NVMe-oF), etc.). As is known in the art, NVMe or NVM Express® is a specification defining how host software communicates with non-volatile memory across a PCI Express® (PCIe®) bus. As will be discussed in greater detail below, a storage protocol may generally include standards or protocols for physically connecting and transferring data between computing devices and peripheral devices. In some implementations, a storage protocol path may generally include a hardware and/or software communication link between a computing devices and peripheral devices.

Queue Operations

Figure 4:
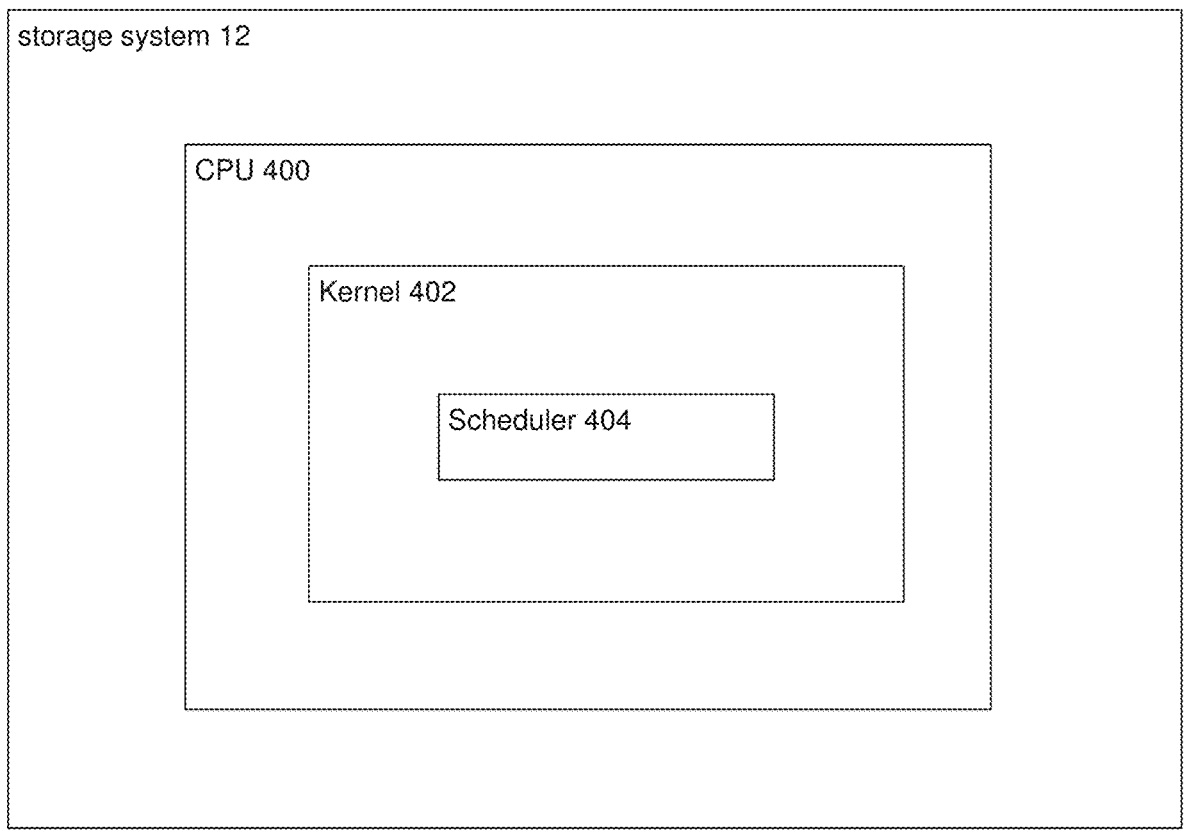
FIG. 4 is an example diagrammatic view of the storage system of FIG. 1 according to one or more example implementations of the disclosure.
Figure 5:
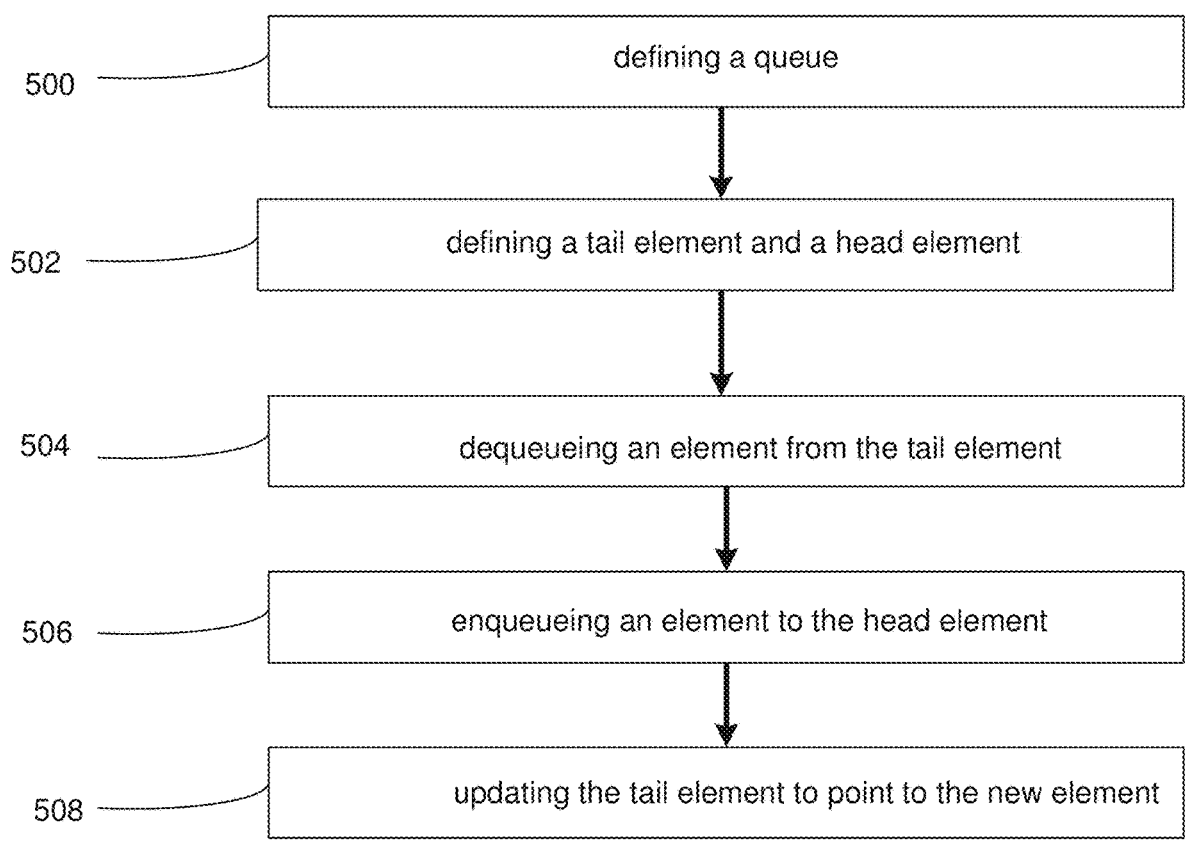
FIG. 5 is an example flowchart of the efficient lockless and loop less multi-producer/single-consumer first-in, first-out (FIFO) queue process of FIG. 1 according to one or more example implementations of the disclosure.
Figure 6:
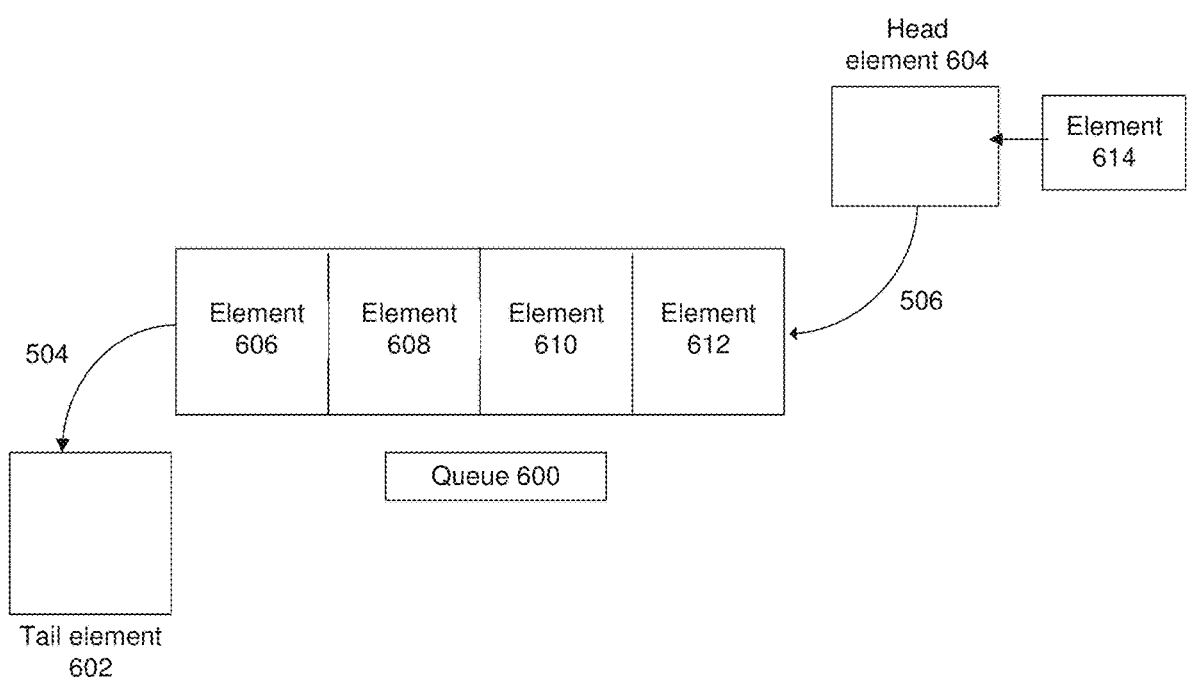
FIG. 6 is an example block diagram of the efficient lockless and loop less multi-producer/single-consumer FIFO queue process of FIG. 1 according to one or more example implementations of the disclosure.

Referring to FIGS. 4-6, efficiency of queue operations may be of the utmost important to a critical system component such as a run scheduler (hereinafter "scheduler") within a central processing unit (CPU) (e.g., CPU 400) of a storage system. Further, the scheduler (e.g., scheduler 404) may be configured to be a kernel (e.g., kernel 402) of a system (e.g., storage system 12). The scheduler (e.g., scheduler 404) may ensure performance of the CPU is not hindered based on a set of rules and/or policies. Further, the scheduler (e.g., scheduler 404) may be responsible for running a thread within the queue (e.g., queue 600) and may support adding a thread to the existing thread within the queue (e.g., queue 600) during operation of the scheduler (e.g., scheduler 404).

In some embodiments, a multi-producer/single-consumer first-in, first-out (FIFO) queue process may be widely used by a high performance server application, such as a storage cluster (e.g., storage cluster 300). In this configuration, any minor contention on spinlock, short busy-wait, or a minor overhead of code of a scheduler itself may cause overall performance degradation. As such, the multi-producer/single-consumer FIFO queue may be CPU-inefficient, specifically in regards to enqueuing and dequeuing operations.

In some embodiments, a multi-producer/single-consumer FIFO queue (e.g., queue 600) may be configured to be used with a scheduler (e.g., scheduler 404) where the scheduler (e.g., scheduler 404) may include cooperative threads/jobs.

In some embodiments, a scheduler (e.g., scheduler 404) may include enqueue and dequeue operations that may be associated with an application that may have specific requirements. For example, an application requirement for efficiency of a producer associated with an enqueue operation may be identical to efficiency of a consumer associated with a dequeue operation. However, an efficiency requirement of enqueue and dequeue operations may be asymmetric in, for example, a scheduler (e.g., scheduler 404) using cooperative threads and/or jobs. For example, a scheduler (e.g., scheduler 404) using cooperative threads and/or jobs may include a separate set of per-priority queues for each core of a CPU (e.g., CPU 400). In this embodiment, different application threads may enqueue new entries (i.e. threads) to corresponding priority queues (i.e., a multi-producers) during a run. The scheduler (e.g., scheduler 404) may dequeue an entry (i.e., a thread) from the queue (e.g., queue 600) and let the thread entry (i.e., thread) run on the CPU. The scheduler (e.g., scheduler 404) may be the only thread that may be configured to dequeue an entry (i.e., thread) from the queues for each core of a CPU according to a policy. The scheduler (e.g., scheduler 404) may dequeue. Therefore, the scheduler may be a "single consumer." Also, in order to provide flexible inline prioritization, the scheduler may make a decision as to which queue to dequeue a next entry from on each dequeuing cycle. In this implementation, the scheduler may be a XIOS RdyQ scheduler in an XtremIO cluster or Transport Run Queue (TRQ) scheduler in a Trident cluster, which are available from the Assignee of the subject application. Both the XIOS RdyQ scheduler in an XtremIO cluster and the Transport Run Queue (TRQ) scheduler in a Trident cluster examples may utilize a cooperative scheduler where a scheduler may let a thread run on a CPU and that thread may release the CPU back to the scheduler where the scheduler does not preempt (i.e., stop) a running thread.

In some embodiments, a configuration of a scheduler queue (e.g., queue 600) may be based on a linked list. In this configuration, a spinlock may be maintained for each queue to serialize an operation on the queue. Therefore, both enqueue and dequeue operations may be performed under spinlock.

In some embodiments, a scheduler (e.g., scheduler 404) may utilize a lockless approach. However, a lockless approach may include several weakness, including involving busy-waiting, not allowing dynamic growing of a queue, and/or not allowing entries to be dequeued one by one. This may prevent flexible prioritization in a scheduler (e.g., scheduler 404) and may only allow dequeuing of an entire queue and/or merging.

In some embodiments, a scheduler (e.g., scheduler 404) may utilize a lockless queue based on a linked list and an atomic operation. However, busy waiting may be involved in case of a race condition (i.e., an element is added and/or linked to a queue). As such, rather than a bust-waiting spinlock, a wait may occur, as illustrated by Table 1 below:

TABLE 1

```
do {
    p = ctx->tail;
    if (atomic(&ctx->tail, p, tmpnode)) {
        p->next=tmpnode;
        break;
    }
} while(1);
```

Further, when applying a list-based solution to a scheduler (e.g., scheduler 404), dequeuing entry by entry of the queue (e.g., queue 600) in real time to reduce contention may not be allowed. Rather, merging of an entire input of a queue (e.g., queue 600) to a temporary queue (e.g., queue 600) may be applied instead. However, this may prevent the scheduler (e.g., scheduler 404) from making flexible real time prioritization between multiple priority queues.

In some embodiments, a scheduler (e.g., scheduler 404) may utilize a lockless queue (e.g., queue 600), based on a ring buffer and an atomic operation. In this embodiment, the queue (e.g., queue 600) may have a predefined fixed size which may correspond to a size of a ring buffer, which may not allow dynamic queue growing. As a result, the scheduler (e.g., scheduler 404) may not be useable in a high scalable application, such as a scheduler in a storage cluster.

Lockless and Loop Less Queue Process

Referring to FIGS. 4-6 in more detail, an embodiment of efficient lockless and loop less queue process 10 is shown where efficient lockless and loop less queue process 10 may allow for efficient one by one dequeue in a lockless and loop less multi-producer/single-consumer FIFO queue. As such, efficient lockless and loop less queue process 10 may provide extremely CPU-efficient enqueue/dequeue operations, which may improve overall system performance. Further, efficient lockless and loop less queue process 10 may be applied to high performance server application.

In some embodiments, a queue may be defined 500. A tail element (e.g., tail element 602) and a head element (e.g., head element 604) may also be defined 502. The tail element (e.g., tail element 602) may be defined from the elements (e.g., element 606, 608, 610, 612) within the queue (e.g., queue 600). The head element (e.g., head element 604) may be defined from an element (e.g., element 614) to be added to the queue (e.g., queue 600). An element (e.g., element 606, 608, 610, 612) may be dequeued 504 from the tail element (e.g., tail element 602) and an element may be enqueued 506 to the head element (e.g., head element 604). Further, lockless and loop less queue process 10 may be based on an atomic operation on a first element (i.e., a head element) or a last element (i.e., a last element) tail element, a next element, and a predefined last element mark.

In some embodiments, a last element mark may include a predefined value that may be configured to distinguish a steady last element (i.e., a "next" pointer within an element that may point to a next element in a queue (if present) is null) from a race condition when an element is added (i.e., linked)/enqueued 506 to the queue, via a provider, concurrently while an element is dequeued 504. In this embodiment, a consumer may be responsible for setting the last element mark when dequeuing 504 an element (i.e., a last element) as well as setting the tail element (e.g., tail element 602) to null. Further, a producer may update 508 the tail element (e.g., tail element 602) to point to a new element. The producer may be a next producer meaning the producer that adds/enqueues 506 the new element after the consumer sets the last element mark.

In some embodiments, the queue (e.g., queue 600) may include queue elements (e.g., element 606, 608, 610, 612) and may be based on a linked list. For example, but not limited to, the queue (e.g., queue 600) may be a first-in, first-out (FIFO) queue that may be used with multiple producers and a single consumer.

In some embodiments, the tail element (e.g., tail element 602) may point to a last/oldest element of the elements. Additionally, the head element may point to a first/newest element of a plurality of elements (e.g., element 606, 608, 610, 612) (i.e., each element within the queue (e.g., queue 600) may include a "next" attribute that points to a next element in the queue (e.g., queue 600), if a next element is present). Further, the head element (e.g., head element 604) and tail element (e.g., tail element 602) may be maintained where maintaining the head element (e.g., head element 604) and tail element (e.g., tail element 602) in the queue (e.g., queue 600) may include updating the head element (e.g., head element 604) and tail element (e.g., tail element 602) during an enqueue 506 and/or a dequeue 504 operation.

In some embodiments, an initial state of the queue (e.g., queue 600) may be defined when defining 500 the queue. When defining an initial state of the queue (e.g., queue 600), the last element mark may be defined as well as setting the tail element (e.g., tail element 602) and head element (e.g., head element 604) as null. Aspects of the above mentioned embodiment may be implemented as shown below in Table 2:

TABLE 2

```
Initial State:
    /* LAST_ELEMENT_MARK is just some predefined value that
    guaranteed cannot be equal to any valid pointer*/
    #define LAST_ELEMENT_MARK (0x8000000000000UL)
    Tail = NULL;
    Head = NULL;
```

In some embodiments, dequeuing 504 an element (e.g., element 606, 608, 610, 612) from the tail element (e.g., tail element 602) may include determining if the tail element (e.g., tail element 602) is in a null state. Determining if the tail element (e.g., tail element 602) is in a null state may include setting, via a consumer, the tail element (e.g., tail element 602) as null and determining the queue (e.g., queue 600) is empty. If the queue (e.g., queue 600) is determined to be empty, the tail element (e.g., tail element 602) may be marked as a last element and may be updated via a producer to point to the next element. Alternatively, the tail element (e.g., tail element 602) may be determined to not be in a null state, to which the tail element (e.g., tail element 602) may be set to a null state until a producer updates the tail element (e.g., tail element 602). Aspects of the above may be implemented as shown below in Table 3:

TABLE 3

```
Dequeue( ):
    element = Tail; /* take the oldest element (i.e. from
    the Tail) */
        if (element == NULL) {
          return NULL;
        }
        /* If this is the last element ('next' is NULL), the 'next'
    pointer is marked as "Last"*/.
        * Otherwise, next element exists, and the Tail should
    be set to point to it. */
            old_next = atomic_cas(&element->next, NULL,
    LAST_ELEMENT_MARK);
            if (old_next != NULL) {
                /* Not the last element, Tail is updated to the next
    element */
                Tail = old_next;
            } else {
                /* In this case, only the next producer is
    responsible for
                * updating the tail to the next element and
    freeing the current element.
                * Until that happens, the tail is set to NULL to
    prevent next consumers
                * from touching the current element * */
                atomic_cas(Tail, element, NULL);
            }
            return element;
```

In some embodiments, an element (e.g., element 614) may be enqueued 506 to the head element (e.g., head element 604), which may include adding a new element (e.g., element 614) to the queue. The tail element (e.g., tail element 602) may then be updated 508 to point to the new element (e.g., element 614). Further, updating 508 the tail element (e.g., tail element 602) to point to the new element (e.g., new element 614) may include consuming the last element (e.g., element 606, 608, 610, 612) via a consumer and marking the last element (e.g., element 606, 608, 610, 612) by the consumer for a producer via the consumer. Aspects of the above may be implemented as shown below in Table 4:

TABLE 4

```
Queue(new_element):
    /* prepare the new element */
    new_element->next = NULL;
    /* add the element to the queue */
    old_head = atomic_fetch_old_and_set(&Head, new_element);
        if (old_head == NULL) { /* i.e. the first element is added to the
    empty queue. */
        /* since the queue was empty, we should update the Tail as well
    */
            Tail = new_element;
    } else {
            old_next = atomic_cas(&old_head->next, NULL,
        new_element);
        if (old_next == LAST_ELEMENT_MARK) {
            /* reaching here when the queue was in fact empty. the last
    element was
                * consumed and marked by the consumer for the next
    producer (this one)
                * to update the tail to the new element. */
                Tail = new_element;
        }
    }
```

In some embodiments, lockless and loop less queue process 10 may not be able to guarantee that an element (e.g., element 614) that is being enqueued 506 (i.e., an enqueuing in progress) will be returned by a concurrent dequeue 504 call. This may be due to the fact that there may be no wait when dequeuing 504 since queueing may be complete as well as an entry being dequeue-able. However, lockless and loop less queue process 10 may guarantee that if multiple elements are called to dequeued 504, the elements will be called in a FIFO order. Though, for certain application such as a scheduler, the above may be negligible.

In light of the above embodiments of lockless and loop less queue process 10, extremely CPU-efficient enqueue/dequeue operations may be provided. Specifically, lockless and loop less queue process 10 may not require any spinlock contention or any other type of spinning/busy waiting, regardless of an edge (i.e., where multiple conditions happen such as adding an element in parallel to removing a last element) or race cases being present, as described above. Further, lockless and loop less queue process 10 may require a minimal amount of CPU cycles. For example, lockless and loop less queue process 10 may require just a few commands to be implemented on a system.

While the above embodiments are directed towards a queue used in regards to a scheduler, this is for example purposes only and should not be construed as a limitation. Lockless and loop less queue process 10 may be applied to a scheduler queue and/or another queue with similar requirements to a scheduler queue.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   defining a queue, wherein the queue is based on a linked list and is a first-in, first-out (FIFO) queue that is configured to be used with multiple producers and a single consumer, wherein the queue includes a plurality of elements with a tail element and a head element defined wherein the tail element is a last element of the plurality of elements of the queue and the head element is a first element of the plurality of elements of the queue;
   dequeuing an element from the tail element, wherein dequeuing the element from the tail element includes: setting, via a consumer, a last element mark, and determining if the tail element is in a null state; and
   enqueuing an element to the head element, wherein enqueuing the element to the head element includes adding a new element to the queue.

2. The computer-implemented method of claim 1, wherein determining if the tail element is in the null state further includes setting, via the consumer, the tail element as null and determining the queue is empty.

3. The computer-implemented method of claim 2, wherein determining the queue is empty includes marking the tail element as the last element.

4. The computer-implemented method of claim 2, further comprising updating the tail element, via a producer, in response to determining the queue is empty to point to the new element.

5. The computer-implemented method of claim 1, further comprising:
   determining the tail element is not in the null state; and
   in response to determining the tail element is not in the null state, setting the tail element to the null state until a producer updates the tail element.

6. The computer-implemented method of claim 4, wherein updating the tail element to point to the new element includes consuming, via the consumer, the last element and marking, via the consumer, the last element by the consumer for the producer.

7. The computer-implemented method of claim 1, further comprising:
   defining a last element mark by setting, via the consumer, the tail element as null, wherein the last element mark is a predefined value that is configured to distinguish a steady last element from a race condition when the new element is added to the queue, via a provider, concurrently while the element is dequeued.

8. A computer program product residing on a non-transitory computer readable medium having a plurality of instructions stored thereon which, when executed by a processor, cause the processor to perform operations comprising:
   defining a queue, wherein the queue is based on a linked list and is a first-in, first-out (FIFO) queue that is configured to be used with multiple producers and a single consumer, wherein the queue includes a plurality of elements with a tail element and a head element defined wherein the tail element is a last element of the plurality of elements of the queue and the head element is a first element of the plurality of elements of the queue;
   dequeuing an element from the tail element, wherein dequeuing the element from the tail element includes: setting, via a consumer, a last element mark, and determining if the tail element is in a null state; and
   enqueuing an element to the head element, wherein enqueuing the element to the head element includes adding a new element to the queue.

9. The computer program product of claim 8, wherein determining if the tail element is in the null state further includes setting, via the consumer, the tail element as null and determining the queue is empty.

10. The computer program product of claim 9, wherein determining the queue is empty includes marking the tail element as the last element.

11. The computer program product of claim 9, further comprising updating the tail element, via a producer, in response to determining the queue is empty to point to the new element.

12. The computer program product of claim 8, further comprising:
   determining the tail element is not in the null state; and
   in response to determining the tail element is not in the null state, setting the tail element to the null state until a producer updates the tail element.

13. The computer program product of claim 11, wherein updating the tail element to point to the new element includes consuming, via the consumer, the last element and marking, via the consumer, the last element by the consumer for the producer.

14. The computer program product of claim 8, further comprising:
   defining a last element mark by setting, via the consumer, the tail element as null, wherein the last element mark is a predefined value that is configured to distinguish a steady last element from a race condition when the new element is added to the queue, via a provider, concurrently while the element is dequeued.

15. A computing system comprising:
   a memory; and
   a processor configured to define a queue, wherein the queue is based on a linked list and is a first-in, first-out (FIFO) queue that is configured to be used with multiple producers and a single consumer, wherein the queue includes a plurality of elements with a tail element and a head element defined, wherein the tail element is a last element of the plurality of elements of the queue and the head element is a first element of the plurality of elements of the queue, wherein the processor is further configured to dequeue an element from the tail element, wherein dequeuing the element from the tail element includes: setting, via a consumer, a last element mark and determining if the tail element is in a null state, and wherein the processor is further configured to enqueue an element to the head element, wherein enqueuing the element to the head element includes adding a new element to the queue.

16. The computing system of claim 15, wherein determining if the tail element is in the null state further includes setting, via the consumer, the tail element as null and determining the queue is empty.

17. The computing system of claim 16, wherein determining the queue is empty includes marking the tail element as the last element.

18. The computing system of claim 16, wherein the processor is further configured to update the tail element, via a producer, in response to determining the queue is empty to point to the new element.

19. The computing system of claim 15, wherein the processor is further configured to:
  determine the tail element is not in the null state; and
  in response to determining the tail element is not in the null state, setting the tail element to a null state until a producer updates the tail element.

20. The computing system of claim 18, wherein updating the tail element to point to the new element includes consuming, via the consumer, the last element and marking, via the consumer, the last element by the consumer for the producer.

21. The computing system of claim 15, wherein the processor is further configured to:
  define a last element mark by setting, via the consumer, the tail element as null, wherein the last element mark is a predefined value that is configured to distinguish a steady last element from a race condition when the new element is added to the queue, via a provider, concurrently while the element is dequeued.

* * * * *